United States Patent
Bruhn et al.

(10) Patent No.: US 10,306,412 B2
(45) Date of Patent: May 28, 2019

(54) METHOD FOR ADJUSTING A WIRELESS NETWORK BASED ON WHETHER A DEVICE IS BEING USED

(71) Applicant: DISH Technologies L.L.C., Englewood, CO (US)

(72) Inventors: Christopher William Bruhn, Aurora, CO (US); Phuc H. Nguyen, Parker, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/788,792

(22) Filed: Jul. 1, 2015

(65) Prior Publication Data

US 2017/0006618 A1 Jan. 5, 2017

(51) Int. Cl.
*H04W 4/02* (2018.01)
*H04W 4/70* (2018.01)
*H04W 84/12* (2009.01)

(52) U.S. Cl.
CPC ............ *H04W 4/025* (2013.01); *H04W 4/70* (2018.02); *H04W 84/12* (2013.01)

(58) Field of Classification Search
CPC ............ H04W 72/10; H04W 72/0453; H04W 72/1247; H04W 72/0446; H04W 8/18; H04W 4/025; H04W 4/70; H04W 84/12
USPC ............... 455/452.1, 450, 509, 452
See application file for complete search history.

(56) References Cited

U.S. PATENT DOCUMENTS

| | | | |
|---|---|---|---|
| 2008/0279213 A1* | 11/2008 | Tong | H04L 12/40143 370/458 |
| 2009/0122701 A1* | 5/2009 | Goldman | H04L 12/5695 370/232 |
| 2011/0105132 A1* | 5/2011 | Vasudevan | H04W 48/16 455/448 |
| 2014/0119352 A1* | 5/2014 | Matsumoto | H04L 1/0043 370/337 |
| 2014/0309893 A1* | 10/2014 | Ricci | H04W 48/04 701/49 |
| 2014/0323141 A1* | 10/2014 | Boos | H04B 7/02 455/452.1 |
| 2015/0099505 A1* | 4/2015 | Kiukkonen | H04W 8/22 455/419 |
| 2015/0172462 A1* | 6/2015 | Cudak | H04M 3/4365 455/413 |
| 2015/0222527 A1* | 8/2015 | Shah | H04L 45/3065 370/338 |
| 2015/0264698 A1* | 9/2015 | Wu | H04W 72/10 370/329 |
| 2016/0043953 A1* | 2/2016 | Ringland | H04W 28/0231 370/230 |
| 2016/0088438 A1* | 3/2016 | O'Keeffe | H04W 4/21 455/456.2 |

* cited by examiner

*Primary Examiner* — Said M Elnoubi
(74) *Attorney, Agent, or Firm* — Seed Intellectual Property Law Group LLP (57) ABSTRACT

A wireless access point servicing multiple clients can have access to sensors that can be used to determine which clients have users present and potentially who those users are. Using this information, the wireless access point can automatically adjust the wireless network as appropriate in order to provide the optimal system performance.

20 Claims, 6 Drawing Sheets

METHOD FOR ADJUSTING A WIRELESS NETWORK BASED ON WHETHER A DEVICE IS BEING USED

BACKGROUND

Technical Field

The present disclosure is directed to wireless access points and, more particularly, wireless access points changing a parameter based on whether a wireless device is being used.

Description of the Related Art

Many modern electronics can be connected to wireless local area networks (WLAN).

Wireless access points are the central connection point for a WLAN. The wireless access point uses radio waves to allow a variety of wireless devices to communicate to each other. The wireless access point may also provide connection to a wired network. A very large number of computers, electronics devices, appliances, and everyday items now come with wireless capabilities and will connect to a wireless access point.

Wireless access points are most often based on IEEE 802.11 standards, commonly referred to as Wi-Fi. Wireless access points communicate with connected wireless devices, commonly called clients, using a number of different parameters for the communication signals, such as RF frequency/channel. Wi-Fi devices are capable of communications in the 2.4 GHz and 5 GHz bands. Within the 2.4 GHz and 5 GHz bands are a number of different channels, each having a bandwidth of about 20 MHz, and channels can be bonded to increase the bandwidth.

Each wireless device that is connected to an access point will generally have an optimum channel for communication with the access point. Many different factors affect which channel is optimum for each device, such as the location of the device, the interference present, the wireless transceiver, RF front end and antenna configuration contained within the wireless device, and how many other access points are in the area. Any given WLAN may have several different wireless devices connected to a single access point at any given time, each potentially having a different channel at which their communications with the access point are optimum.

Access points could be configured to automatically change the channel they are communicating on if a connected wireless device is not responding with acknowledgements and/or the desired throughput is not being achieved. However, when the access point changes the channel to increase the communication signal with a first wireless device, it could result in a decreased communication signal with another wireless device.

BRIEF SUMMARY

According to one embodiment, the access point may be servicing multiple clients and may adjust the wireless network to provide the best performance based on the clients that have a user(s) present. This may be accomplished by first sensing for the presence of users near particular wireless devices, getting user location information from personal devices carried or worn by users, and/or in the case of a wireless set-top box, determining if the connected TV is powered on; and then second, changing the access point channel to one that produces the best performance for those clients with users present. This process can be dynamic as users move to different clients.

According to one embodiment, in the case where there are multiple clients with a user(s) present, the particular users may be identified and/or the number of users at each client may be counted, and this info may be used to assign a priority to the clients. The wireless network can then be adjusted to provide the best performance to the higher priority client(s). This process can be dynamic as users move to different clients.

DETAILED DESCRIPTION

Figure 1:
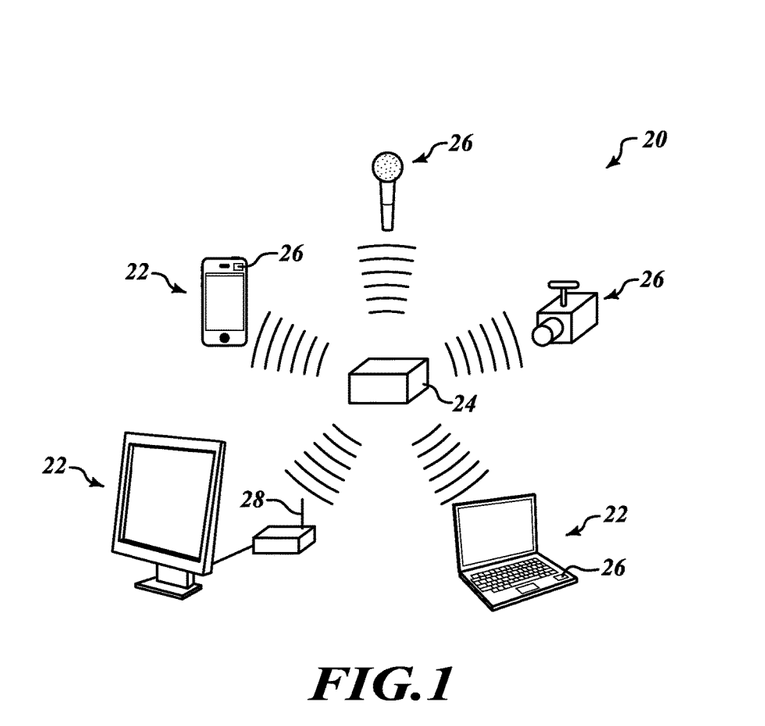
FIG. 1 is a schematic representation of one embodiment of the present disclosure.

FIG. 1 shows a wireless network 20 having a number of wireless devices 22 connected to each other. The wireless network 20 includes a wireless access point 24 that sends and receives signals with the wireless devices 22, and acts as a central connection point for all connected devices. The wireless access point 24 is also connected with one or more wireless sensors 26, which are used to detect whether a user is within a determined proximity of one of the wireless devices 22.

The access point 24 may be connected to a larger network, such as the Internet, or may provide local access only. Individual wireless devices 22 and sensors 26 use transceivers 28 to communicate with the wireless access point 24, sending signals back and forth. Through the wireless access point 24, wireless devices 22 and sensors 26 are also able communicate with each other.

The wireless devices 22 can be any number of different devices. For example, they may include tablets, smartphones, laptop computers, desktop computers, audio/video devices such as set-top boxes, televisions, home appliances or any other device capable of wireless connectivity. Many modern homes or offices have extensive networks, connecting dozens of different items and allowing central control of any number of devices. There may be many wireless devices within a particular network, for examples as shown in FIG. 1 there may be a first wireless device, such as smartphone 22, a second wireless device such as portable computer 22, a third wireless device such as display screen 22 and so forth.

Various wireless sensors 26 may also be connected to the network 20. These sensors could include microphones, video cameras, motion sensors, light sensors, or any other device capable of receiving input about an aspect of the environment the network 20 is located in. In some embodiments, the sensors 26 may be integrated with the wireless devices 22. For example, many computers and televisions now have integrated microphones and video cameras. Other embodiments may include sensors 26 that detect if a wireless device 22 is on or off. For example, a sensor 26 may be a switch or controller built into a television that provides information to the network 20 regarding whether the television is currently turned on or off.

Each of the sensors 26 is configured to detect whether one or more wireless devices 22 are currently being used. Generally, each sensor 26 will be located close to and correspond with one or more wireless devices 22. If a sensor 26 detects that a person is near the sensor, the access point 24 will interpret this detection to mean that one or more of the corresponding wireless devices 22 is being used. As will be discussed below with respect to FIGS. 3 and 4, the wireless access point 24 will adjust its parameters in response to the signals from the sensors 26. For example, if the microphone sensor 26 indicates that a corresponding computer wireless device 22 is currently being used, the wireless access point may adjust its parameters to provide a stronger communication connection between the access point 24 and the computer wireless device 22.

In some embodiments, the sensor 26 will be stationary, such as a mounted video camera or microphone, and correspond to nearby stationary wireless devices 22, such as a television or set-top box. The sensors 26 detect the presence of a user in a number of different ways, depending on the sensor 26 being used. For example, a microphone sensor 26 will be able to pick up noises, such as human voices or sounds coming from a television or radio, that tend to indicate that a person is in the area. If a microphone sensor 26 that corresponds to a computer wireless device 22 is picking up voices or other noises, the sensor 26 will send a signal to the access point 24 indicating that the corresponding computer wireless device 22 is being used. For stationary sensors 26 and stationary wireless devices 26, the access point 24 will assume that a user in the presence of the sensor 26 is also using the corresponding wireless device 22 adjacent to the sensor 26.

In one embodiment, each of the sensors 26 is a stand-alone sensor which has the capability of sensing whether a human is present. There are numerous types of sensors which can sense the presence of a person. These include motion sensors, microphones, acoustic sensors, infrared sensors, air pressure sensors, cameras that have facial recognition to identify a particular person, or other types of sensors which recognize the local presence of a person and, in many cases, the specific identity of that person. In one embodiment, the sensors are positioned adjacent to a stationary wireless device 22. For example, some wireless devices 22 may be a desktop computer which is generally a stationary device. Other wireless devices may be a set-top box, a cable receiver, or other stationary computer devices.

In other embodiments, the sensor 26 could be mobile, and therefore correspond to different wireless devices 22 depending on the current location of the sensor 26. For example, the sensor 26 may be located within a smartphone, tablet, laptop, or other similar mobile wireless device. The sensor 26 in such a device could be a GPS module, which detects the location of the wireless device. In other implementations, the sensor 26 could determine the strength of a signal coming from the access point 24, and estimate a location based on the signal strength. In such an embodiment, a user may first be requested to walk around the environment the network 20 is contained in, so that the strength of the signal at various locations can be determined and stored in a database. Preferably, the database would be connected to the access point 24, which would compare the current signal strength of a sensor 26 to the list of known signal strengths to approximate the location of the sensor 26. Once the location of the sensor 26 is determined, the access point 24 may look up nearby wireless devices 22 in order to determine which wireless devices are currently being used.

In some instances, the sensor 26 will be within the wireless device itself as shown in the two embodiments of FIG. 1, one in which the wireless device 22 is a smartphone and the other in which the wireless device 22 is a portable computer. In each of these, there is a sensor which indicates the physical location of that device. Most smartphones, as well as portable computers, have GPS functionality. In addition, they also have motion sensors, accelerometers, gyroscopes, and other sensors for movement. Accordingly, the GPS sensor which is located within these devices can be used as a location device. As will be appreciated, GPS sensors often do not work indoors and, therefore, other types of location sensors may be used to supplement the GPS sensor, such as tracking the movement of the most recent GPS reading, such as some type of distance calculation after a GPS signal is lost or by measuring the access point signal strength and/or transmit time to the local wireless device 22.

According to one embodiment of the present invention, it is the user who has the priority, not the particular wireless device. The desire is therefore to identify the particular user of the wireless device 22, not just the wireless device. For example, if a person with a high priority is recognized as working with the portable computer 22 shown in FIG. 1, then this wireless device 22 is given higher access to the access point 24. Smartphones, portable computers, desktop computers and most computing devices contain cameras and sufficient processing power to identify a particular person. This can be done by using the built in camera of the device as the sensor 26 to image the face of the person using the device and then perform facial recognition to match a database of users stored either in the memory 32 of the access device 24, memory in a networked device, or a memory of that computing device itself. Facial recognition software and matching to a set of images stored in a database are well known in the art. Accordingly, when a particular person is using a wireless device 22, that particular device 22 can use its own camera associated with that device 22 to obtain an image of its user and then the software can recognize the identity of the particular user and then, depending on the identity of that user, modify parameters on access point 24 that affect the performance of wireless device 22. In one example, a parent in a home may rate themselves as the highest priority and therefore any wireless device 22 they are using, whether computer, desktop or laptop; smartphone, etc., will be given the highest priority by the access point 24. Later on, if a second person uses the same wireless device 22, whether it is a portable computer, desktop computer or smartphone, the camera can recognize that a different user is presently using that device and modify the priority to the access point 24 to that of the new user. It is appreciated that most smartphones are personal to a single individual and therefore, in one embodiment, the smartphone itself, having been linked long term to a particular user, can provide an indication as to the priority to the access point 24 of any person making use of that particular smartphone as the wireless device 22. Alternatively, the smartphone, while in use, can use its camera to take a picture of the current user and, processing that person's identity using facial recognition or other technique, can set the priority for that smartphone as a wireless device 22 in order to establish its priority with respect to the access point 24.

Of course, wireless devices 22 and the sensor 26, whether stand alone or as a part of the wireless device, have many techniques for identifying the current user, such as a fingerprint, iris signature comparison, voice recognition and the like and any techniques or sensors 26 that can be used to identify a particular user of the wireless device 22 can be used.

Figure 2:
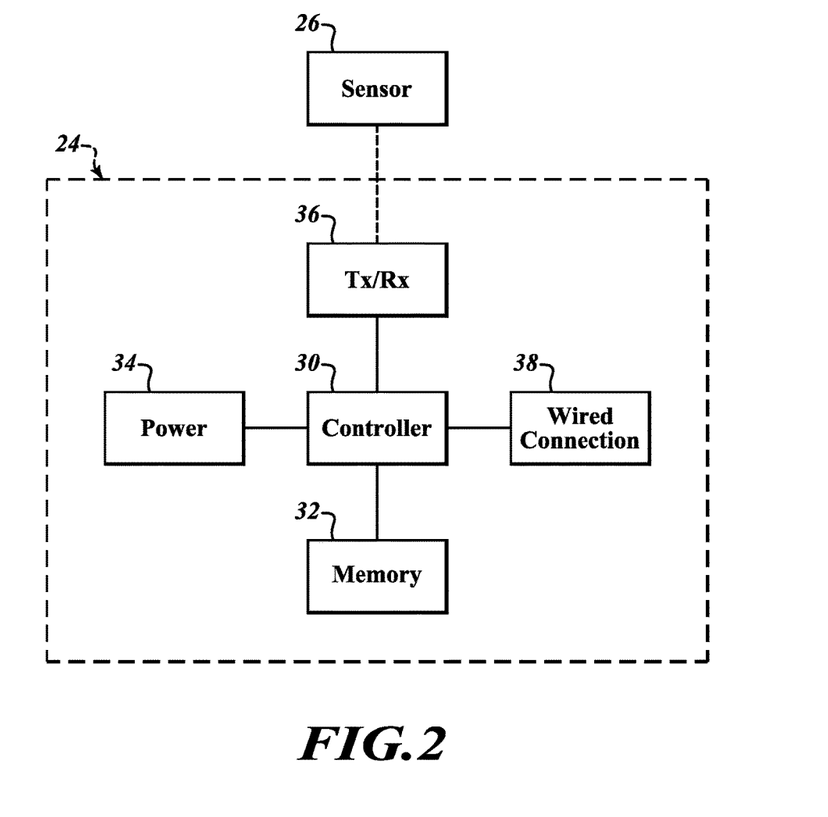
FIG. 2 is a block diagram schematic of the wireless access point 24 of FIG. 1.

FIG. 2 shows a block diagram of the wireless access point 24. The wireless access point 24 includes a controller 30, memory 32, power source 34, and transmitter/receiver 36. In some embodiments the wireless access point may also have a wired connection 38, which may connect the access point 24 to a broader network, such as the Internet.

The controller 30 can be any integrated circuit capable of executing basic program functions. Preferably, the controller 30 is a microprocessor or microcontroller. The controller 30 is coupled to the memory module 32, which may be any suitable memory such as RAM, ROM, FLASH or other similar memory types. The power source 34 is coupled to the controller 30, and to any other components within the access point 24 that may require power. These additional power connections are not shown for clarity. The transmitter/receiver 36 may be a single integrated transceiver, or may be separate transmitter and receiver modules. The transmitter/receiver 36 is used by the access point 24 to communicate with the additional devices connected to the network 20, such as the wireless devices 22 and the sensors 26.

The access point 24, and connected wireless devices 22 and sensors 26, are generally connected through a standard Wi-Fi signal, such as 802.11a, 802.11b, 802.11g, 802.11n or 802.11ac. However, in other embodiments they may use alternative communication standards such as Bluetooth or ZigBee. The access point 24 has a number of different parameters that can be altered to improve or decrease communication signals with connected devices. For example, under the Wi-Fi standard, the access point 24 may communicate over 2.4 GHz or 5 GHz, and will have several different channels to communicate over each of these frequency bands. Different wireless devices 22 will often have different parameters that result in an optimum communication signal with the access point 24. For example, a first wireless device may have the strongest signal when the access point 24 is set to communicate at 2.4 GHz, on channel 4. A second wireless device may have the strongest signal when the access point 24 is set to communicate at 2.4 GHz on channel 11. And a third wireless device may have the strongest signal when the access point 24 is set to communicate at 5 GHz on channel 132.

Figure 3:
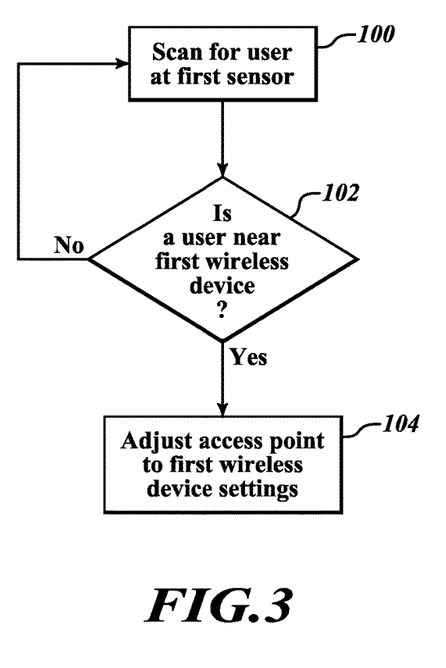
FIG. 3 is a flow chart showing one embodiment of the present disclosure.

The controller 30 is configured to execute steps stored in the memory 32 in order to adjust the communication parameters of the access point 24 to settings associated with the wireless device 22 that is currently being used. FIG. 3 shows one embodiment for determining how to adjust the communication parameters of the access point 24. At 100, the sensor 26 scans to detect if any users are in the proximity of the sensor. This may be accomplished by any of the methods described above, such as detecting motion, detecting noises, or detecting people via a video camera. The controller 30 of the access point 24 receives results of the scan from the sensor 26, and determines if the scan has detected a user at 102. If a user is not present at the sensor 26 when the scan occurs, the access point parameters will not be adjusted. If a user is present at the sensor 26, the controller 30 will assume that the corresponding wireless device 22 is currently being used. If a user is present, the access point adjusts a parameter to increase communications with the wireless device 22 that is currently being used at 104. Generally, this will involve changing a WLAN channel, or changing the frequency range the access point is communicating at. In some embodiments, the controller 30 will compare the wireless device 22 being used to a database of wireless device settings stored in the memory 32 and set the access point parameters to a known channel or frequency contained in the database.

Figure 4:
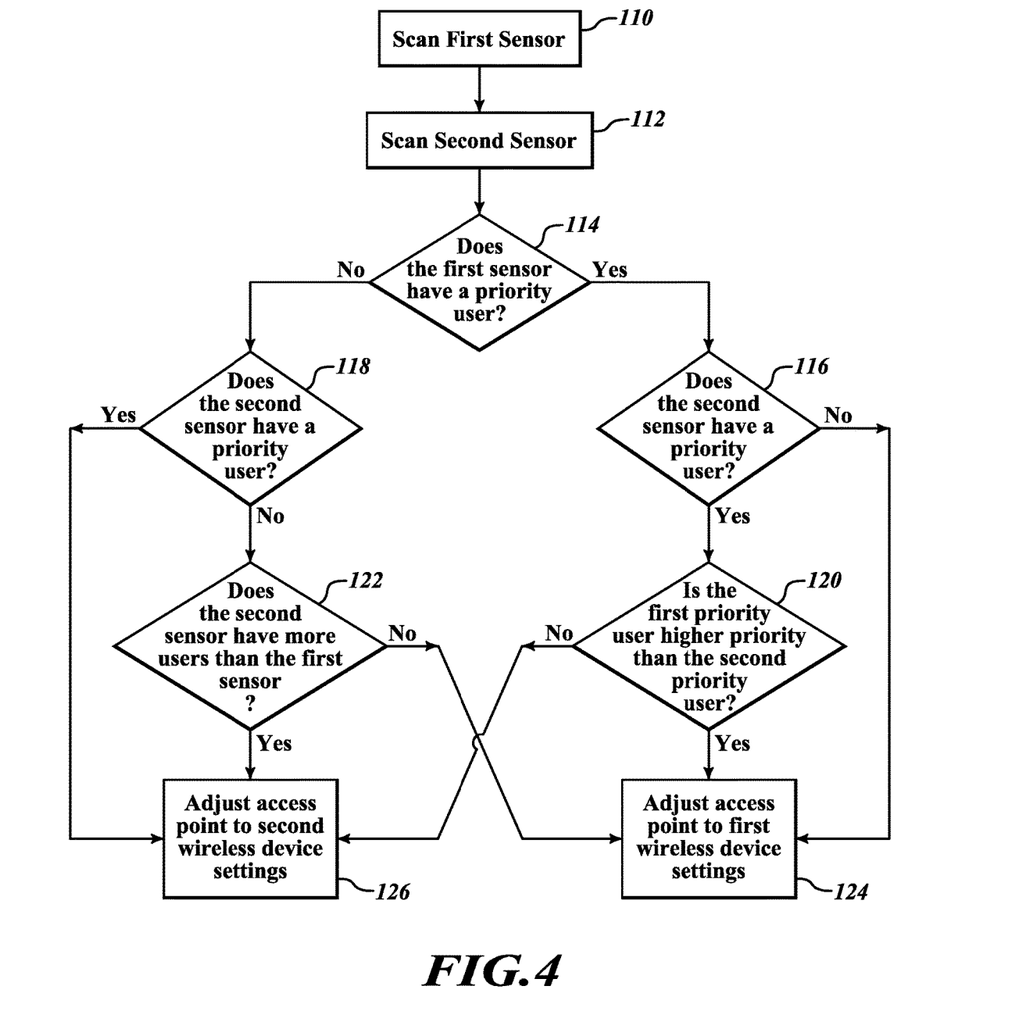
FIG. 4 is a flow chart showing a further embodiment according to the present disclosure.

FIG. 4 shows a second method of adjusting the parameters of the access point 24. A first sensor, associated with a first wireless device, is scanned for the presence of users at 110. A second sensor, associated with a second wireless device, is also scanned for the presence of users at 112. The controller 30 then compares the users detected to a database of known users to determine if any users are known. This can be accomplished by any known method such as facial recognition software, voice recognition software, or by tracking if personal devices such as a smartphone that are only associated with a single user are present. The controller 30 then determines, at 114, if the first sensor has any priority users, which may include a parent of a household. If the first sensor has a priority user, the controller then determines if the second sensor also has a priority user at 116. If the second sensor does not have a priority user, the access point is adjusted to increase communications with the first wireless device associated with the first sensor at 124. If the second sensor also has a priority user, the controller 30 determines at 120 if the first or second priority user is higher priority, and adjusts the access point parameters to increase communications with the device that is being used by the higher priority user.

If the first sensor does not have a priority user, the controller 30 determines at 118 if the second sensor has a priority user. If the second sensor has a priority user, then at 126 the access point is adjusted to increase communications with the second wireless device associated with the second sensor. If the second sensor does not have a priority user, the controller 30 determines at 122 which sensor has more users, and adjusts the access point to increase communications with the wireless device associated with the sensor that has more users.

There are a number of techniques by which the wireless communication with a particular wireless device can be improved. In the embodiment in which the access point 24 is a standard wireless transmitter that creates a wireless network, it may have the capability to grant increased airtime/channel access to one or more of the wireless devices. In many wireless networks, it is common to have access point 24 24 attempting to communicate with many wireless devices 22 at any one time. If one of these devices is known to have a higher priority, it can provide increased data throughput to that particular device in the event the accumulative data throughput desired by all of the wireless devices exceeds the standard data throughput capabilities of that particular access point 24.

In addition, the access point 24 can determine the strength of the signal as one data point to assist in selecting a transmission frequency. If the wireless device 22 is physically close to the access point 24, it might be preferred to use the 5 GHz frequency transmission rather than the 2.4 GHz frequency. On the other hand, based on local conditions, such as noise, other devices in the vicinity, it might be preferred to use the 2.4 GHz signal. Accordingly, the access point 24 will determine the priority of the user, along with the signal delivery strength of communication to and from the wireless device 24 and if the 5 GHz frequency provides a more reliable link for communication, it can switch to this frequency for communication when the device is close. On the other hand, when the same devices moves to a new location in the house, the access point 24 may recognize that 5 GHz is not the preferred frequency for transmission, accordingly, the access point 24, recognizing that the particular wireless device 22 is being used by a high-priority user, will send a query signal regarding switching to the lower frequency of 2.4 GHz. If the lower frequency signal of 2.4 GHz is acceptable to the high-priority wireless device 22 and also provides a more reliable connection, then the access point 24 will change to the lower frequency for communication to the high-priority wireless device 22, because at its new location the lower frequency provides a better communication channel.

Figure 5:
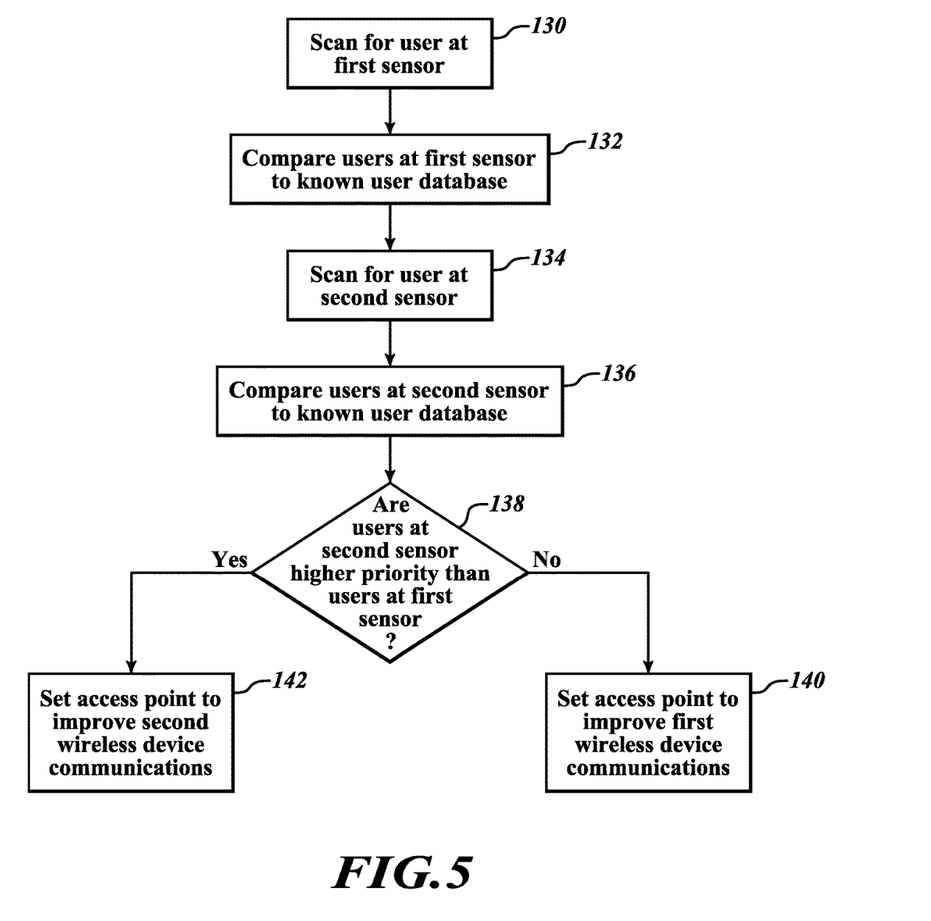
FIG. 5 is yet an additional flow chart showing a further embodiment of the present disclosure.

FIG. 5 shows another embodiment of adjusting the parameters of the access point 24 according to the priority of users sensed at a first and second sensor 26a and 26b, respectively.

As shown in FIG. 5, at step 130, the sensor 26a scans for a user adjacent to the first sensor. As a result of the scan, the first sensor 26a will determine whether there are any users at the first sensor 26a and, therefore, adjacent to the first wireless device 22. The sensor 26a may find zero, one, two, three, or any number of users near the first sensor. The system will then compare the identity of the users located at the first sensor with users stored in a database at step 132. The database contains the number of expected users for a particular system, as well as their priority and relationship to each other. This comparison will therefore provide an indication as to whether or not there are one or more high-priority users adjacent to the first sensor 26a, and if so, the relative priority between them.

At the next step, 134, a scan is made for users at the second sensor 26b. As in the first scan at step 130, the sensor determines the number, if any, of the users adjacent to the second sensor 26b and, for a plurality of users, the identity of each. At step 136, the identity of the users at the second sensor 26b is compared to the known users as stored in the database. The databases used in steps 132 and 136 contain attributes of the particular user. These attributes may, for example, be the type of devices they use, the rank of their priority importance relative to other users, the access they are to be provided to various components in the system, and other information.

At step 138, the system compares the users at the second sensor 26b with the users at the first sensor 26a, to determine the location of the highest priority users. If the highest priority users are at the first sensor, the access point is set, in step 140, to improve the communication at the first wireless device. This improvement may be done to the detriment of the quality communications for the second wireless device that may be adjacent to the second sensor 26b. On the other hand, if the higher priority users are adjacent to the second sensor 26b, then the access point is set to improve the communication devices located adjacent to the second sensor, at step 142.

The control logic for selecting which type of communication channel to use may be located in any acceptable control device. In the embodiment shown in FIG. 1, the system and control logic that is part of the system is within the access point 24, which includes a memory, a microprocessor, control logic, a database of potential users for that particular network, and other specific hardware circuits in order to implement the system, as explained herein. Alternatively, the control logic can be in a device that is other than the access point itself. For example, the control logic for the system could be in a set-top box, a computer server, or some other location, and it can be coupled to the access point via an appropriate connection, either wired or wireless, to form the full system. The wireless access point may therefore communicate with the control logic that determines the access point configuration and provide data to it, and the control logic, located in a different device, such as a set-top box, will perform the steps to determine the configuration to be used by the wireless access point 24, and then output control signals to the wireless access point 24 in order to configure it.

Figure 6:
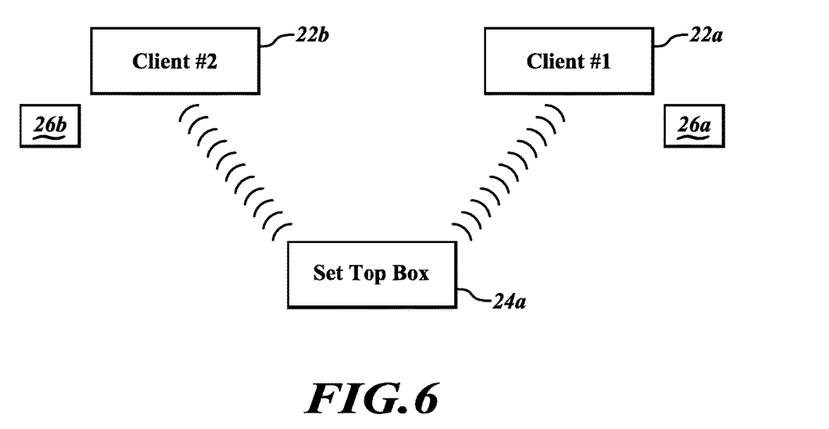
FIG. 6 is a schematic illustration of one embodiment using a set top box system in a user's home.

FIG. 6 provides one example of a specific context that includes a set-top box in a user's home. In this particular example, a set-top box 24a is the wireless access point. It provides wireless communication between a client device #1 and a client device #2, both of which permit viewing of the video channel from the set-top box. For client #1, 22a, operation on channel 149/80 may create the best experience for viewing. On the other hand, transmission and operation on channel 36/80 may create the best viewing experience and most reliable communication for client #2, 22b. The sensor 26a, which is adjacent to client #1, 22a, will recognize that the user is adjacent to that client device, and will broadcast to client #1 using the most reliable channel—in this example, 149/80. In many instances, the user will have two or more viewing screens inside a single home, and the user may leave the room that contains the viewing screen 22a, which is client #1, and walk into the room in which the viewing screen 22b is present, which is client #2. Therefore, the sensor 26b that is associated with client device #2 will recognize that the user has entered that room and will begin to communicate with client #2 using the most reliable channel for that client—in this case channel 36/80. The set-top box 24a will therefore switch from transmitting on channel 149/80 to transmit on channel 36/80. In most instances, client #1 and client #2 will be able to receive the signal on both transmission channels; namely, both client #1 and client #2 can receive the signal transmitted on channel 149/80 and also the signal transmitted on channel 36/80. However, the system as described herein recognizes that the more reliable communication which gives the best signal operation for client #1 is a first channel, while the more reliable one for client #2 is a second channel. Therefore the system will recognize, using the appropriate sensors 26, the location of the user, and the set-top box will broadcast on the channel which will provide the best communication for the viewing device 22a or 22b which is most adjacent to the user.

Another benefit, in the case when the user moves between the two rooms, they might turn the TV off but leave the wireless set-top box on, which would mean it would still be streaming video content, and hence wasting wireless transmission time, so it would be good for the controller to recognize that the user has left the room, and command the set-top box to turn off or go into standby mode.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a transceiver configured to send and receive wireless signals over a first wireless network with at least a first wireless device and a second wireless device;
a networked first sensor configured to recognize a specific identity of a current user of the first wireless device;
a networked second sensor configured to recognize a specific identity of a current user of the second wireless device; and
a controller coupled to the transceiver and configured to:
receive a first signal from the networked first sensor, the first signal being representative of an identity of the current user of the first wireless device;
receive a second signal from the networked second sensor, the second signal being representative of an identity of the current user of the second wireless device;
assign one of the first and second current users of the wireless devices a higher priority status based upon the identity of the first and second user; and
adjust a parameter of the transceiver to optimize the connection quality of the current user of one of the first or second wireless device having the higher priority status over the lower priority status user to the other of the first or second wireless device for a same service, wherein the adjustment of the transceiver to optimize the connection quality for the higher priority status user changes WLAN channels or frequency range for the higher priority status user as the higher priority status user moves from one location to another location with respect to the wireless access point while still enabling a connection of the lower priority user.

2. The device of claim 1, wherein each of the first and second sensors include a camera configured to detect the identity of the first or second user, respectively.

3. The device of claim 2, wherein each camera determines the identity of each current user by the use of facial recognition software.

4. The device of claim 1, wherein adjusting the parameter of the transceiver includes:
changing a wireless local area network channel of the device.

5. The device of claim 1, the controller being further configured to:
determine whether the throughput needs of the first wireless device are being met; and,
change a transmission frequency/channel and/or the airtime/channel access of the transceiver to the first wireless device if the throughput needs of the first wireless device are not being met.

6. The device of claim 1, wherein the optimizing of the connection of the higher priority status user includes changing WLAN channels or frequency range.

7. The device of claim 1, wherein the optimizing of the connection of the higher priority status user includes improving the signal strength connection.

8. A system, comprising:
a first wireless device and a second wireless device;
a first sensor configured to recognize a specific identity of a current user of the first wireless device;
a second sensor configured to recognize a specific identity of a current user of the second wireless device;
a wireless access point being in communication with the first and second wireless devices and the first and second sensors, the wireless access point having:
a transceiver configured to send signals to the first and second wireless devices and to receive signals from the first and second sensors; and
a controller configured to:
receive a first signal from the first sensor indicating the current user's identity as associated with the first wireless device;
receive a second signal from the second sensor indicating the current user's identity as associated with the second wireless device;
assign one of the first or the second current users of the wireless devices a higher priority status based upon the user's identity as associated with either the first or second wireless devices; and
adjust a parameter of the transceiver to optimize the connection quality of the current user of one of the first or second wireless device having the higher priority status over the lower priority status user to the other of the first or second wireless device for a same service, wherein the adjustment of the transceiver to optimize the connection quality for the higher priority status user changes WLAN channels or frequency range for the higher priority status user as the higher priority status user moves from one location to another location with respect to the wireless access point while still enabling a connection of the lower priority user.

9. The system of claim 8, wherein each of the first and second sensors includes a camera located within a mobile device.

10. The system of claim 8, wherein each of the first and second sensors includes a microphone and the system is configured to perform voice recognition of each current user.

11. The system of claim 8, wherein each of the first and second sensors includes a motion sensor configured to detect motion in proximity to the first or second wireless device.

12. The system of claim 8, wherein each of the first and second sensors is configured to determine distance of a wireless access point from the first or second wireless device based on signal strength of at least one of a Wi-Fi, Bluetooth or ZigBee signal.

13. The system of claim 8, wherein each of the first and second sensors is configured to determine if a device connected to the first or second wireless device is powered on.

14. The system of claim 8, wherein each of the first and second sensors is housed within the first or second wireless device, respectively.

15. The system of claim 8, wherein the wireless access point is configured to communicate via a Wi-Fi protocol.

16. A method, comprising:
recognizing a specific identity of a first current user of a first wireless device;
recognizing a specific identity of a second current user of a second wireless device;
receiving the first current user identification signal at a wireless access point from a first sensor in wireless communication with the wireless access point;
receiving the second current user identification signal at the wireless access point from a second sensor in wireless communication with the wireless access point;
assigning one of the first or second current user identifications a higher priority status based upon the user identification signals; and
adjusting a parameter of the transceiver to optimize the connection quality of the current user of one of the first or second wireless device having the higher priority status over the lower priority status user to the other of the first or second wireless device for a same service, wherein the adjustment of the transceiver to optimize the connection quality for the higher priority status user changes WLAN channels or frequency range for the higher priority status user as the higher priority status user moves from one location to another location with respect to the wireless access point while still enabling a connection of the lower priority user.

17. The method of claim 16, further comprising:
detecting at least one current user's proximity to a first wireless device at the first sensor;
transmitting the detected current user's proximity to the first wireless device to the wireless access point;
detecting at least one current user's proximity to the second wireless device at the second sensor;
transmitting the detected current user's proximity to the second wireless device to the wireless access point;
adjusting the parameter of the wireless access point based on the current user's proximity to the first wireless device and the second wireless device.

18. The method of claim 16, further including:
determining the number of current users detected at a first wireless device and the number of current users detected at a second wireless device;
assigning one of the first and second wireless devices a second higher priority status based on which sensor has more users detected at the first and second sensors;
adjusting a parameter of the wireless access point based on the second higher priority status wireless device.

19. The method of claim 16, further including determining if a first or second wireless device is being used by monitoring a microphone for sounds made near each of the wireless devices.

20. The method of claim 16, further including determining if a first or second wireless device is being used by monitoring a camera for current users near each of the wireless devices.

* * * * *